US009405791B2

(12) United States Patent
Fierro et al.

(10) Patent No.: US 9,405,791 B2
(45) Date of Patent: Aug. 2, 2016

(54) REMOTELY UPDATED TOOLBAR LANGUAGE TRANSLATION SERVICE

(75) Inventors: Alex Fierro, San Jose, CA (US); Aleksey Nikolayevich Shlyapnikov, Los Altos, CA (US); Anton Viktorovich Vayvod, Moscow (RU); Dmitry Gozman, St. Petersburg (RU)

(73) Assignee: Google Inc., Mountain View, CA (US)

( * ) Notice: Subject to any disclaimer, the term of this patent is extended or adjusted under 35 U.S.C. 154(b) by 362 days.

(21) Appl. No.: 13/991,240

(22) PCT Filed: Dec. 13, 2010

(86) PCT No.: PCT/RU2010/000749
§ 371 (c)(1),
(2), (4) Date: Oct. 28, 2013

(87) PCT Pub. No.: WO2012/082005
PCT Pub. Date: Jun. 21, 2012

(65) Prior Publication Data
US 2014/0052702 A1  Feb. 20, 2014

(51) Int. Cl.
G06F 9/44 (2006.01)
G06F 9/445 (2006.01)
G06F 17/30 (2006.01)
G06F 17/28 (2006.01)

(52) U.S. Cl.
CPC ............ G06F 17/30377 (2013.01); G06F 8/65 (2013.01); G06F 9/4448 (2013.01); G06F 17/289 (2013.01); G06F 8/71 (2013.01)

(58) Field of Classification Search
CPC ................... G06F 17/30377; G06F 17/30345; G06F 8/61–8/65; G06F 9/4448; G06F 17/289; G06F 8/71
See application file for complete search history.

(56) References Cited

U.S. PATENT DOCUMENTS

| 8,140,617 | B1* | 3/2012 | Ewe | 709/203 |
| 8,442,811 | B1* | 5/2013 | Broniek | G06F 17/24 |
| | | | | 379/387.01 |
| 8,839,126 | B1* | 9/2014 | Tang et al. | 715/764 |

(Continued)

FOREIGN PATENT DOCUMENTS

WO    WO 00/68836 A2    11/2000

OTHER PUBLICATIONS

Guangli Zhu, Themes Updating Model based on TIBG, 2009, pp. 1-4.*

(Continued)

Primary Examiner — Thuy Dao
Assistant Examiner — Mongbao Nguyen
(74) Attorney, Agent, or Firm — McDermott Will & Emery LLP

(57) ABSTRACT

A translation service provided by a browser toolbar may be automatically updated. In one implementation, a device may obtain a version identifier corresponding to a first configuration file, stored locally by the device, that includes configuration options relating to a language translation service provided by a browser toolbar implemented by the device. The device may request a version identifier corresponding to a second configuration file, stored at an update server and determine whether the second configuration file is different than the first configuration file. The device may download the second configuration file when the second configuration file is different than the first configuration file may update operation of the language translation service based on the obtained options.

24 Claims, 8 Drawing Sheets

(56) References Cited

U.S. PATENT DOCUMENTS

| | | | |
|---|---|---|---|
| 2006/0026595 A1* | 2/2006 | Nakayama | G06Q 10/10 718/100 |
| 2006/0174196 A1* | 8/2006 | Zhang | G06F 9/4448 715/236 |
| 2006/0282795 A1* | 12/2006 | Clark | G06Q 10/10 715/840 |
| 2007/0288488 A1* | 12/2007 | Rohrs | G06F 17/3089 |
| 2008/0052663 A1* | 2/2008 | Cope | G06F 21/10 717/101 |
| 2008/0114739 A1* | 5/2008 | Hayes | 707/3 |
| 2008/0172603 A1* | 7/2008 | Agarwal | G06F 17/2247 715/239 |
| 2008/0250398 A1* | 10/2008 | Takahashi | G06F 9/4448 717/147 |
| 2008/0313208 A1* | 12/2008 | Hourselt | G06F 8/73 |
| 2009/0144723 A1* | 6/2009 | Hartin | G06F 8/65 717/173 |
| 2009/0171802 A1* | 7/2009 | Raygoza | 705/26 |
| 2009/0210214 A1 | 8/2009 | Qian et al. | |
| 2009/0287671 A1* | 11/2009 | Bennett | G06F 17/289 |
| 2010/0023873 A1* | 1/2010 | Chang et al. | 715/747 |
| 2010/0070521 A1* | 3/2010 | Clinchant | G06F 17/30669 707/760 |
| 2010/0107150 A1* | 4/2010 | Kamada et al. | 717/170 |
| 2010/0125839 A1* | 5/2010 | Gebis | G06F 9/44536 717/170 |
| 2010/0286977 A1 | 11/2010 | Chin et al. | |
| 2011/0029876 A1* | 2/2011 | Slotznick | G09B 5/06 715/727 |
| 2011/0066422 A1* | 3/2011 | Hybschmann | G06F 17/289 704/3 |
| 2011/0202522 A1* | 8/2011 | Ciemiewicz | G06F 17/30867 707/711 |
| 2011/0214118 A1* | 9/2011 | Antill | G06F 9/4448 717/174 |
| 2012/0137221 A1* | 5/2012 | Bhandari | G06F 9/4448 715/719 |
| 2012/0159377 A1* | 6/2012 | Naranjo | G06F 3/0482 715/780 |
| 2012/0166548 A1* | 6/2012 | Gropper | G06Q 30/02 709/205 |
| 2012/0271621 A1* | 10/2012 | Jia | G06F 9/4448 704/8 |
| 2013/0167156 A1* | 6/2013 | Ressler | G06F 9/542 719/313 |
| 2013/0226555 A1* | 8/2013 | Lerum | G06F 9/4448 704/2 |
| 2015/0019985 A1* | 1/2015 | Murphy | G06F 17/30899 715/744 |

OTHER PUBLICATIONS

Andrew Clement, The PIPWatch Toolbar: Combining PIPEDA, PETs and market forces through social navigation to enhance privacy protection and compliance, 2008, pp. 1-10.*

Peter Likarish, B-APT: Bayesian Anti-Phishing Toolbar, p. 2008, pp. 1-5.*

The International Search Report and Written Opinion issued for International Application No. PCT/RU2010/000749, mailed on Oct. 12, 2011, 10 pages.

* cited by examiner

```
{
  "VERSION_NUMBER": 1.2,
  "TRANSLATION_METHODS":
  [
    {
      "NAME": "TRANSLATE",
      "REQUEST": {
        "HOSTNAME": "EXAMPLE.COM",
        "PORT": "80",
        "PARAMETERS": {
          "SL": "{{SOURCE_LANGUAGE}}",
          "TL": "{{TARGET_LANGUAGE}}",
          "Q": "{{WORD}}",
          "CLIENT": "TOOLBAR",
        }
      },
      "RESPONSE": "TYPE_1"
    }
  ],
  "LANGUAGE_PAIRS":
  [
    {
      "FROM": "EN",
      "TO": "RU",
      "METHODS":
      [
        "LOCAL",
        "TB_DICTIONARY",
        "SUGGEST",
        "TRANSLATE"
      ]
    }
  ]
}
```

Fig. 5

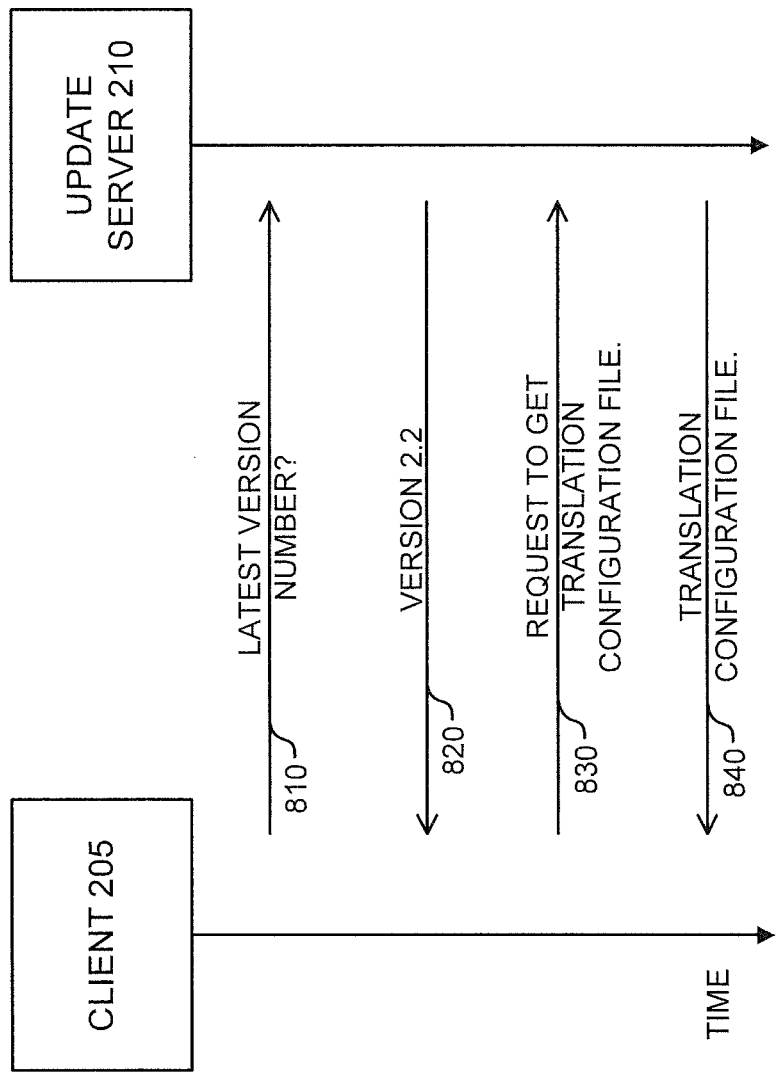

REMOTELY UPDATED TOOLBAR LANGUAGE TRANSLATION SERVICE

BACKGROUND

Many techniques are available to users today to find information on the world wide web ("web"). For example, users often use web browsers and/or search engines to find information of interest.

Browsers, and other programs, may include the capability to include add-on toolbars to the browser interface. The add-on toolbar may be presented as a graphical bar on which onscreen buttons, icons, menus, or other input or output elements may be placed. Third-party developers may create add-on toolbars that add functionality to the browser. One such add-on function that is integrated into some add-on toolbars is translation. Web sites may be presented in various languages. Toolbars that include a translation service may allow users to translate a select portion or all of the web site. The translation service, provided by the toolbar, may be relatively complex process that may be frequently updated or changed.

SUMMARY

According to an implementation, a method may include obtaining a version identifier corresponding to a first configuration file, stored locally by a device, that contains configuration options relating to a language translation service provided by a browser toolbar implemented by the device. The method may further include requesting a version identifier corresponding to a second configuration file, stored at an update server. The method may further include determining, based on the version numbers corresponding to the first and second configuration files, whether the second configuration file is different than the first configuration file. The method may further include downloading the second configuration file, from the update server, when the second configuration file is different than the first configuration file; parsing, by the device, the second configuration file to obtain updated configuration options relating to the language translation service provided by the browser toolbar; and updating, by the device, operation of the language translation service based on the obtained options.

In another implementation, a device may include a translate component, controlled via a graphical element in a browser toolbar, to perform language translation of documents; and a toolbar update component, implemented as part of the browser toolbar. The toolbar update component may: request, via a network, a version identifier corresponding to a latest version of a configuration file, where the configuration file defines options relating to the operation of the translation component; receive, in response to the request, the version identifier of the configuration file; determine, based on the received version identifier and based on a version identifier of a configuration file currently used by the translation component, whether the configuration file currently used by the translation component should be updated; and overwrite, based on a result of the determination, the configuration file currently used by the translation component with the latest version of the configuration file.

In yet another implementation, a computer-readable medium may contain instructions to obtain a version identifier corresponding to a first configuration file, stored locally by a device, that contains configuration options relating to a language translation service provided by a browser toolbar implemented by the device; instructions to request a version identifier corresponding to a second configuration file, stored at an update server; instructions to determine, based on the version numbers corresponding to the first and second configuration files, whether the second configuration file is different than the first configuration file; instructions to download, the second configuration file, from the update server, when the second configuration file is different than the first configuration file; instructions to parse the second configuration file to obtain updated configuration options relating to the language translation service provided by the browser toolbar; and instructions to update operation of the language translation service based on the obtained options.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 5 is a diagram illustrating an example of a translation configuration file;

FIG. 8 is a diagram illustrating an example of a message flow that may be communicated between a client and toolbar update component when updating translation services offered by a toolbar.

DETAILED DESCRIPTION

The following detailed description refers to the accompanying drawings. The same reference numbers in different drawings may identify the same or similar elements.

A toolbar, such as an add-on toolbar for a web browser, may include a translation function. Options relating to the translation function, such as the supported languages, the location of translation dictionaries, or the location of translation servers, may be contained in a configuration file. The configuration file may be automatically updated by the toolbar.

Figure 1:
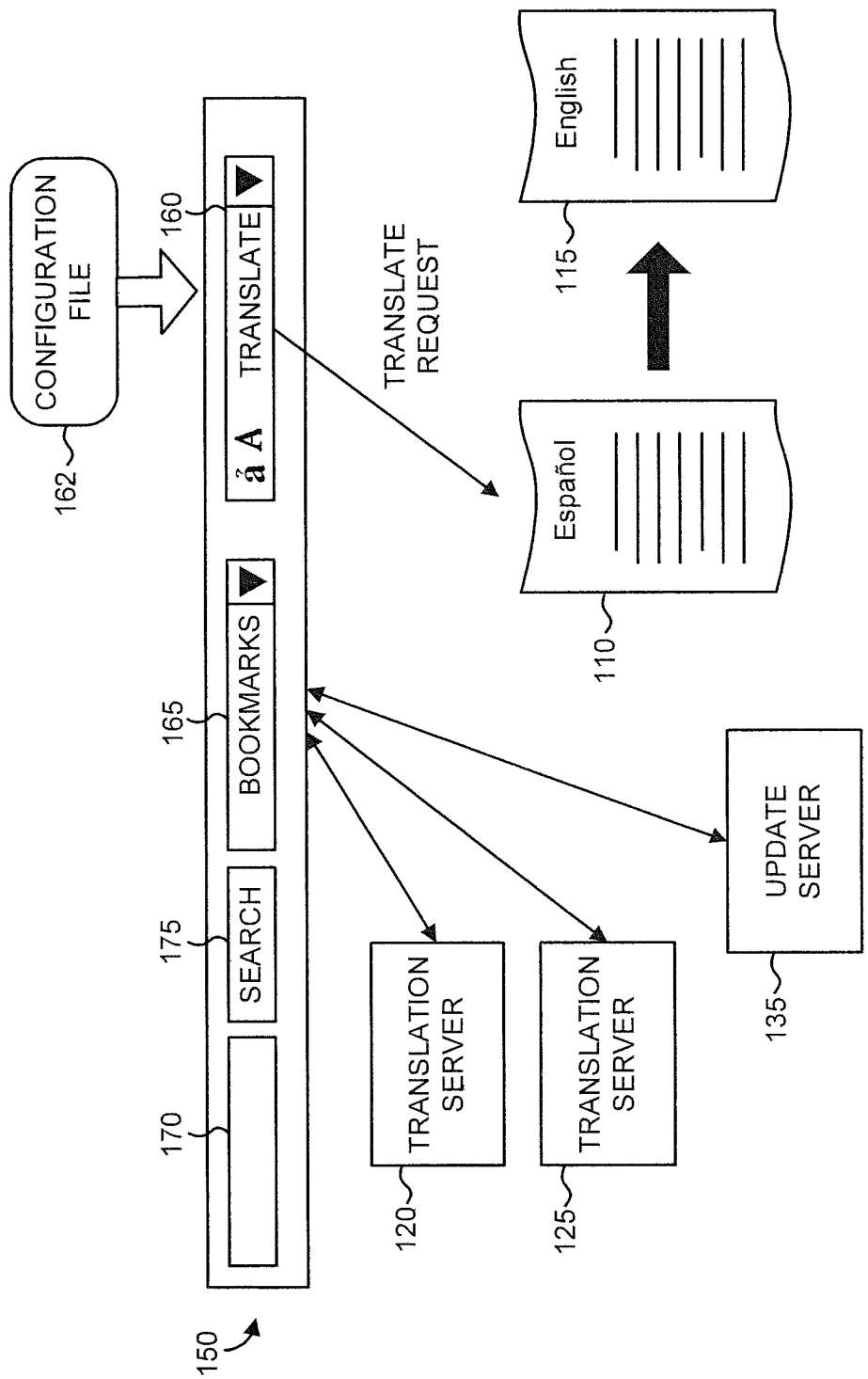
FIG. 1 is a diagram illustrating an overview of an example implementation described herein.

FIG. 1 is a diagram illustrating an overview of an example implementation described herein. Assume that a user has installed a toolbar 150 in an application such as a web browser program. Toolbar 150 is particularly shown as including a number of objects with which the user may interact. Toolbar button 160 may be a translation button through which the user may obtain translation services for a web page, or a portion of a web page, currently being viewed. The user may, for example, select button 160 to initiate translation of the current web page into the user's preferred language. Toolbar 150 may include other toolbar objects, such as a bookmark control 165 that may maintain web page bookmarks for the user, a search box 170 in which a user may type a search query, and a button 175 to submit the search query to a search engine.

Assume that the user is currently viewing, in a web browser, a web page 110 that is in Spanish. The user does not read Spanish and would like to convert the web page into English. The user may select translation button 160. In response, toolbar 150 (or another software object controlled by toolbar 150) may obtain a translated version of web page 110 and present the translated web page, shown as web page 115, to the user.

The translation process performed by toolbar 150 may involve a number of different processes and may be performed locally and/or remotely based on information stored in configuration file 162. For instance, toolbar 150 may submit the text from a web page (or alternatively, the address of the web page) to translation servers, such as translation server 120 and/or translation server 125, which may translate and return an English version of the web page. Configuration information relating to how to translate a particular web page, such as the translation server(s) to use for a particular language, may occasionally change. As indicated above, toolbar 150 may store this configuration information in, for example, a locally stored configuration file 162 that is read whenever toolbar 150 is initialized.

Toolbar 150 may contact update server 135 to ensure the configuration information for the translation function offered by translation button 160 is up-to-date. Toolbar 150 may, for example, periodically contact update server 135 to determine the most recent version of configuration file 162. When the local version of the configuration file is out of date, toolbar 150 may download the most recent version from update service 135. In this manner, configuration options relating to the operation of translation button 160 of toolbar 150 may be automatically kept up-to-date.

A "document," as the term is used herein, is to be broadly interpreted to include any machine-readable and machine-storable work product. A document may include, for example, an e-mail, a web site, a file, a combination of files, one or more files with embedded links to other files, a news group posting, a news article, a blog, a business listing, an electronic version of printed text, a web advertisement, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Figure 2:
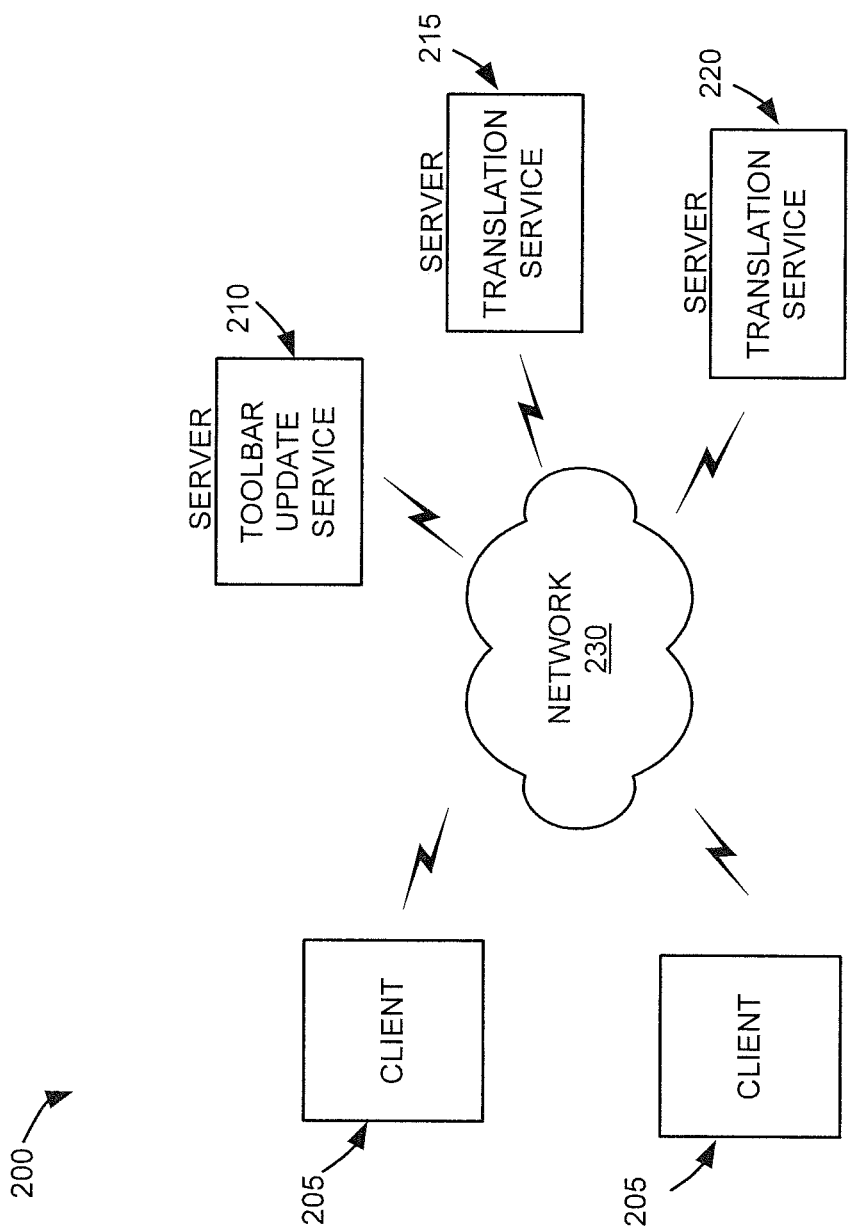
FIG. 2 is a diagram of an example environment in which systems and/or methods described herein may be implemented.

FIG. 2 is a diagram of an example environment 200 in which systems and/or methods described herein may be implemented. Environment 200 may include multiple clients 205 connected to multiple servers 210-220 via a network 230. Two clients 205 and three servers 210, 215, and 220 have been illustrated as connected to network 230 for simplicity. In practice, there may be more or fewer clients and servers. Also, in some instances, a client may perform a function of a server, and a server may perform a function of a client.

Client 205 may include a device, such as a personal computer, a wireless telephone, a personal digital assistant (PDA), a laptop, or another type of computation or communication device; a thread or process running on one of these devices; and/or an object executed by one of these devices. In one implementation, client 205 may include a user interface, presented through a browser, that permits documents to be searched and/or accessed. The user interface of client 205 may particularly include a browser capable of hosting add-on toolbars.

Servers 210, 215, and 220 may include server devices that gather, process, search, and/or implement services in a manner described herein. In one implementation, server 210 may host a toolbar update service that communicates with clients 205 to keep toolbars, used by clients 205, up-to-date. Servers 215 and 220 may implement translation services, such as by providing processes for automatically translating between language pairs. Server 210 will be referred to herein as "update server" 210 and servers 215/220 will be referred to herein as "translation server" 215/220. In some implementations, different ones of severs 215/220 may be configured to perform different translation options, such as translating between different pairs of languages. For example, server 215 may handle English to French translations and server 220 may handle English to Spanish translations.

Additional servers, implementing services other than the toolbar update service or translation service may also be implemented in environment 200. The additional servers may implement, for example, a search engine or other toolbar related services.

While servers 210 through 220 are shown as separate components, it may be possible for one or more of servers 210-220 to perform one or more of the functions of another one or more of servers 210-220. For example, it may be possible that two or more of servers 210-220 are implemented as a single server. It may also be possible for a single one of servers 210-220 to be implemented as two or more separate (and possibly distributed) servers.

Network 230 may include any type of network, such as a local area network (LAN), a wide area network (WAN), a telephone network (e.g., the Public Switched Telephone Network (PSTN) or a cellular network), an intranet, the Internet, or a combination of networks. Clients 205 and servers 210-220 may connect to network 230 via wired and/or wireless connections.

Figure 3:
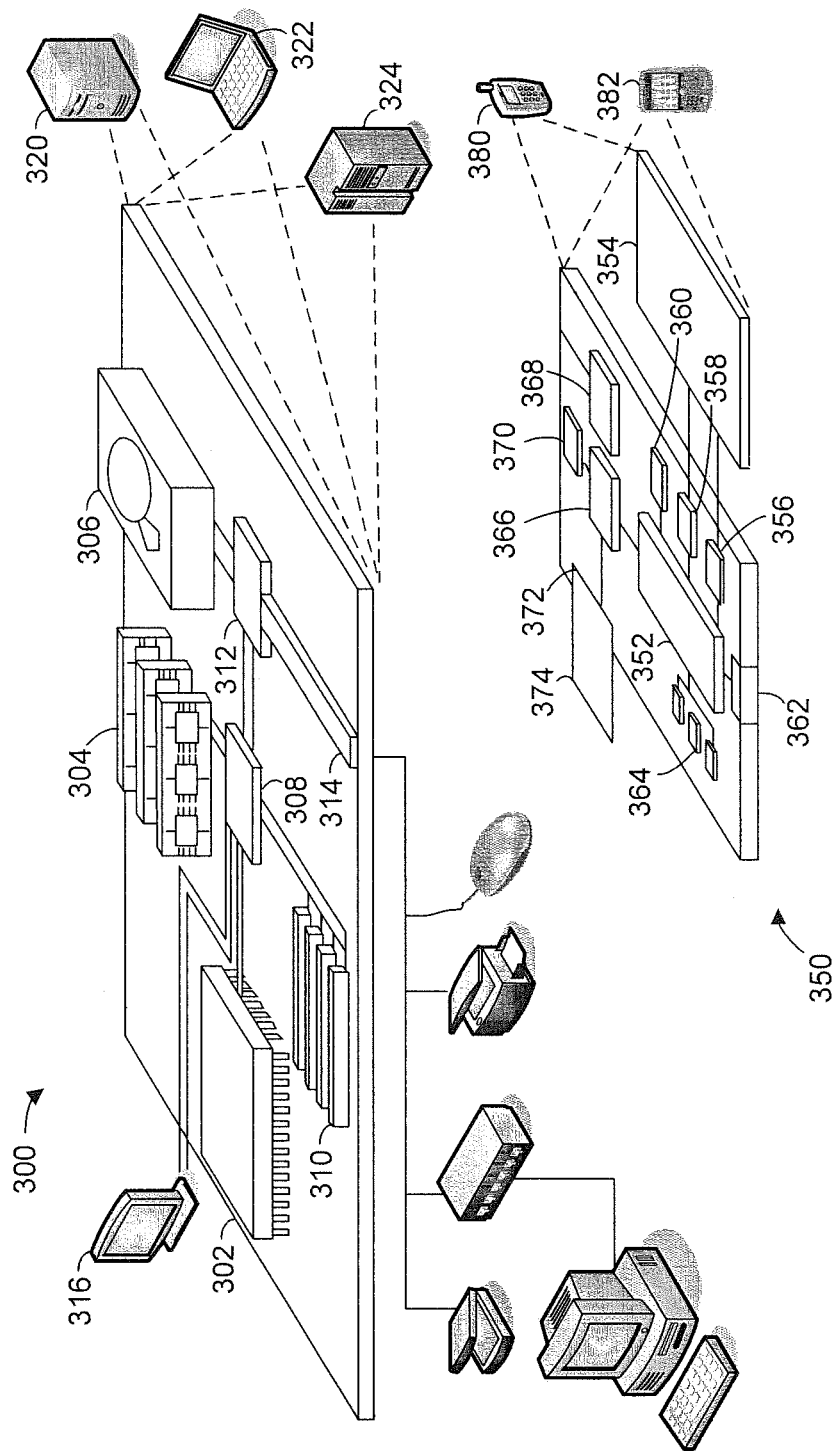
FIG. 3 is a diagram of example components of a client or server.

FIG. 3 shows an example of a generic computer device 300 and a generic mobile computer device 350, which may be used with the techniques described here. Generic computer device 300 may correspond to, for example, one or more of clients 205 and/or servers 210-220. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a graphical user interface (GUI) on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system, etc.).

The memory 304 stores information within the computing device 300. In one implementation, the memory 304 includes a volatile memory unit or units. In another implementation, the memory 304 includes a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer or machine-readable medium, such as the memory 304, the storage device 306, or memory on processor 302.

The high speed controller 308 manages bandwidth-intensive operations for the computing device 300, while the low speed controller 312 manages lower bandwidth-intensive operations. Such allocation of functions is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output (I/O) device such as a display 354, a communication interface 366, and a transceiver 368, among other components. The device 350 may also be provided with a storage device, such as a micro-drive or other device, to provide additional storage. Each of the components 350, 352, 364, 354, 366, and 368, are interconnected using various buses, and several of the components may be mounted on a common motherboard or in other manners as appropriate.

The processor 352 can execute instructions within the computing device 350, including instructions stored in the memory 364. The processor may be implemented as a chipset of chips that include separate and multiple analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD (Thin-Film-Transistor Liquid Crystal Display) or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provide in communication with processor 352, so as to enable near area communication of device 350 with other devices. External interface 362 may provide, for example, for wired communication in some implementations, or for wireless communication in other implementations, and multiple interfaces may also be used.

The memory 364 stores information within the computing device 350. The memory 364 can be implemented as one or more of a computer-readable medium or media, a volatile memory unit or units, or a non-volatile memory unit or units. Expansion memory 374 may also be provided and connected to device 350 through expansion interface 372, which may include, for example, a SIMM (Single In Line Memory Module) card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provide as a security module for device 350, and may be programmed with instructions that permit secure use of device 350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352, that may be received, for example, over transceiver 368 or external interface 362.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS (Global Positioning System) receiver module 370 may provide additional navigation- and location-related wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smart phone 382, personal digital assistant, or other similar mobile device.

Figure 4:
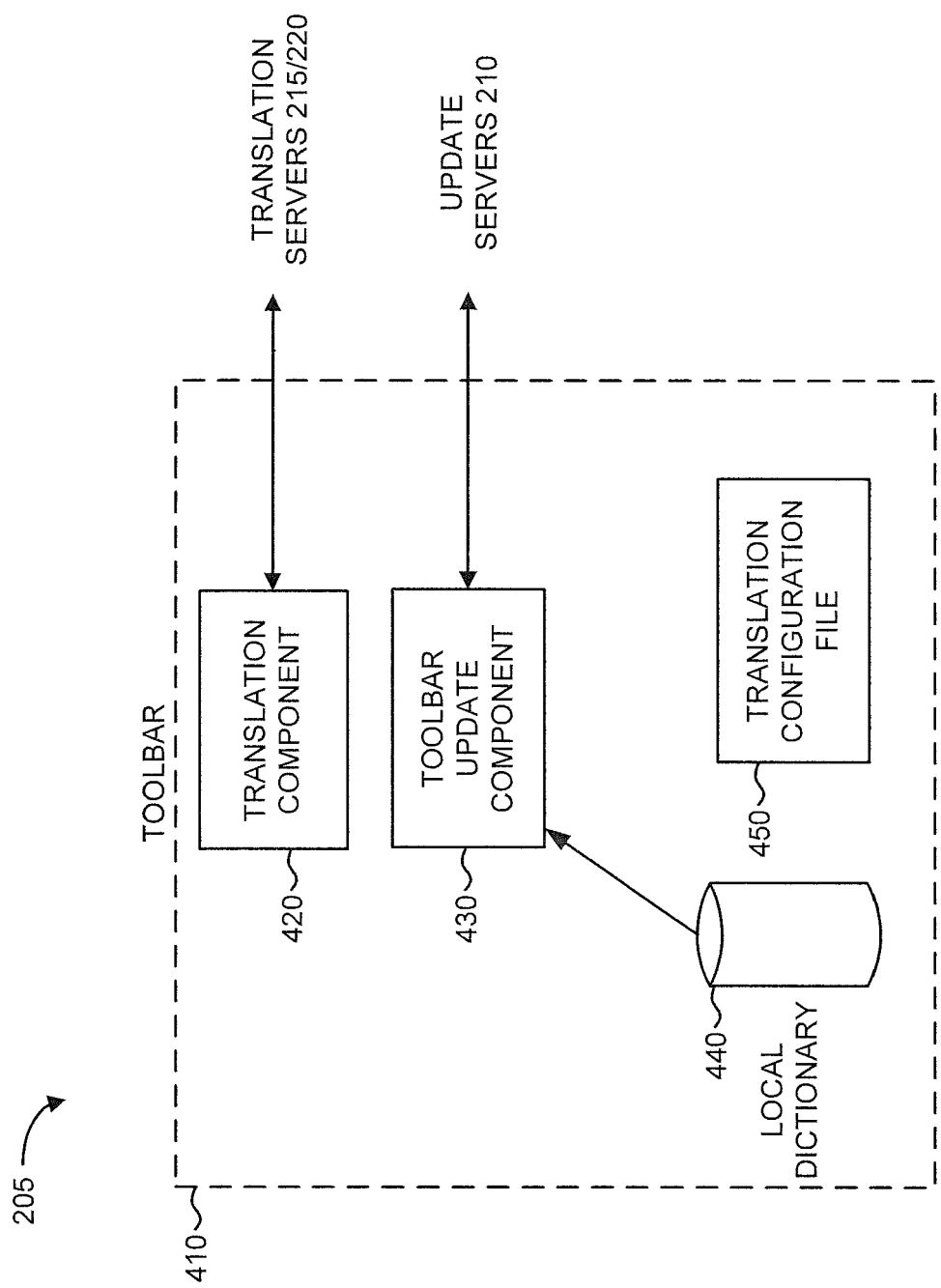
FIG. 4 is a diagram of an example of functional components, of a client, relating to document translation through a toolbar.

FIG. 4 is a diagram of an example of functional components of one of clients 205 relating to document translation through a toolbar. As shown in FIG. 4, client 205 may include a toolbar 410 that includes or is associated with a translation component 420, a toolbar update component 430, a local dictionary 440, and a translation configuration file 450. In another implementation, client 205 may include more or fewer functional components. Translation component 420 may include logic to control the translation performed by toolbar 410 when a user initiates a translation operation (such as by selecting a translation button from the interface that implements toolbar 410). In one implementation, the translation operation may be performed locally and/or remotely (e.g., with the assistance of translation server 215/220). The translation operation may be performed on a single word, a selected section of a web page, or on an entire web page. Depending on the type of translation request, portions of a translation request may be performed by translation component 420 and other portions of a translation request may be performed remotely via a request to a translation server 215/220. For example, if the user requests translation of a single word that is available in a local translation dictionary (such as local dictionary 440), translation component 420 may translate the word locally. If, however, the user requests translation from a language for which no local dictionary is available or a translation of a complex document that can be better handled by translation service, translation component may send the document to translation server 215/220 to perform the translation.

In another implementation, the client-side (local) operations performed by translation component 420 may also include local operations relating to user interaction with toolbar 410 or the web browser. For example, translation component 420 may additionally detect user interaction with a currently displayed web page and when, appropriate, show tooltips relating to the translation of the web page.

Options relating to the operation of translation component 420 may be stored by translation configuration file 450. In one implementation, configuration file 450 may be implemented as a text file, such as a text file formatted using the JavaScript Object Notation (JSON) standard. In other possible implementations, configuration file 450 may be implemented as an extensible markup language (XML) file, custom binary file, or another type of file. Configuration file 450 may specify, for example, the languages that are available for translation, the particular translation server 215/220 or local resource to use for a particular translation request, the protocol to use or formatting requirements to use when communicating with a particular translation server 215/220, backup translation servers to use when a primary translation server is not functioning, languages that are not translated, and/or language models or other objects that may be used for local translation.

Local dictionary 440 may include a translation dictionary, or other translation resource, for translation operations that may be performed locally by translation component 420. As one example, local dictionary 440 may include a simple word translation dictionary for one or more language pairs, such as a dictionary that specifies translations between English/French, English/Spanish, Russian/French, etc. Translation component 420 may then use local dictionary 440 when the user requests a single word translation for a language pair that is available in local dictionary 440, and may otherwise use services of translation server 215/220.

Toolbar update component 430 may include logic to control the updating of the operation of translation component 420. In one implementation, toolbar update component 430 may, at certain times, such as when toolbar 410 is first started or at other times, contact update server 210 to determine whether one or more components of toolbar 410 are to be updated. Toolbar update component 430 may particularly determine whether a new version of translation configuration file 450 should be downloaded from update server 210.

Although FIG. 4 shows example functional components of one of clients 205, in other implementations, the functional components may include fewer components, different components, differently arranged components, or additional components than depicted in FIG. 4. Alternatively, or additionally, one or more of the functional components may perform one or more other tasks described as being performed by one or more other of the functional components.

FIG. 5 is a diagram illustrating an example of translation configuration file 450. In this example, translation configuration file 450 is illustrated as a JSON formatted text file. In other possible implementations, other formats could alternatively be used.

Under JSON, data may be stored as key-value pairs in which the key may be a string and the value may be a string, number (integer or real), boolean, array, or object. Arrays may be defined by corresponding brackets and objects by corresponding curly braces. As shown in FIG. 5, entry 510 includes the key VERSION_NUMBER and the corresponding value 1.2. Entry 520 includes the key TRANSLATION_METHODS and the corresponding value is an array that includes an object that includes the attributes NAME, REQUEST, and RESPONSE. The REQUEST attribute is shown corresponding to an object that defines the fields that may be used when submitting a request. These fields include, for example, the uniform resource locator (URL) (referenced by the key HOSTNAME) of a particular translation server 215/220 that is to be used when submitting the translate request. The object named TRANSLATE may thus define a translation method that may be used by translation component 420 when submitting a translation request to translation server 215/220.

Entry 530 in FIG. 5 includes the key LANGUAGE_PAIRS and the corresponding value is an array that includes objects that define language translation pairs. One particular pair, from English to Russian, is particularly shown. The attribute METHODS for this language pair object may define the methods that are available for this language pair.

Configuration file 450, as shown in FIG. 5, defines a number of options that relate to the operation of translation component 420. The options defined by configuration file 450, as shown in FIG. 5, are illustrative examples. Other or different options could be defined by configuration file 450. Although configuration file 450 is shown as including an embedded version number, in some implementations, instead of or in addition to including the version number within the configuration file, the version number may be associated in some other way with configuration file 450, such as by including the version number in the name of configuration file 450.

Figure 6:
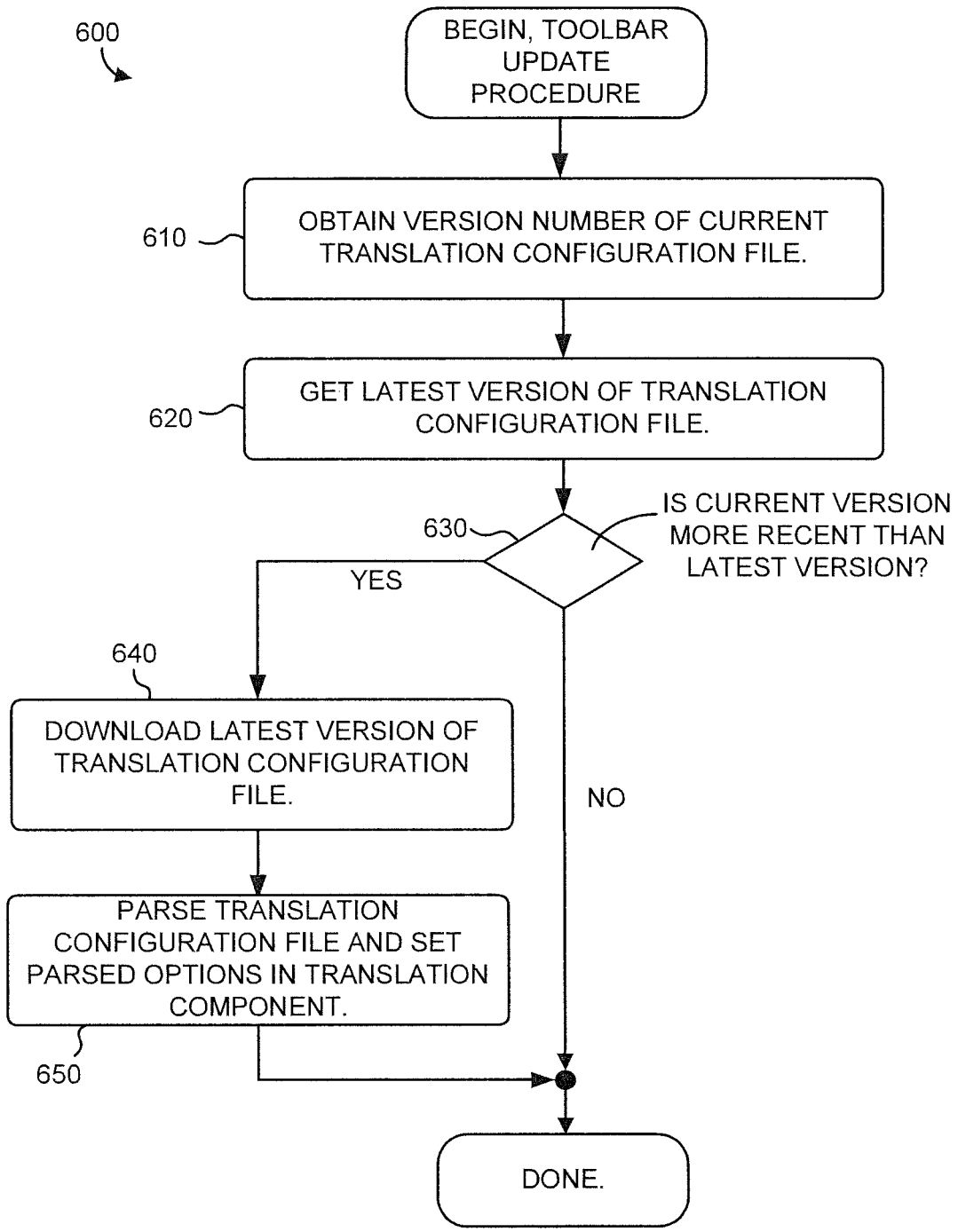
FIG. 6 is a flow chart illustrating an example of a process for updating configuration options for a translation service.

FIG. 6 is a flow chart illustrating an example of a process 600 for updating configuration options for a translation service, such as one implemented by translation component 420. Process 600 may be performed, for example, by toolbar update component 430, at a client 205, to update the operation of translation component 420. In one implementation, process 600 may be performed every time toolbar 410 is started, every time toolbar 410 is started but not more than X (where X is an integer) times per day, based on a manually issued command to perform a toolbar update check, periodically based on the passage of a certain time period (e.g., every five days), based on an update "push" request received from a server, or based on some other criteria.

Process 600 may include obtaining the version number (i.e., an identifier) of the currently installed translation configuration file 450 (block 610). As shown in FIG. 4, the version number may be contained as an entry in translation configuration file 450. Toolbar update component 430 or translation component 420 may parse this file to obtain the version number. Alternatively, the version number may be obtained in another way, such as by toolbar update component 430 retrieving the version number from another storage location (e.g., another file, a database entry, a registry entry, etc.).

Process 600 may further include obtaining the latest (i.e., most up-to-date) version of the translation configuration file (block 620). The latest version of the translation configuration file may be stored by, for example, update server 210. Toolbar update component 430 may query update server 210 to obtain the latest version of the translation configuration file.

Process 600 may further include determining if the latest version of the translation configuration file (as obtained in block 620) is newer than the current installed version of translation configuration file 450 (as obtained in block 610) (block 630). In implementations in which the version of the translation configuration file is indicated by a number that is increased for each version update, the determination in block 630 may include comparing the two version numbers. In other implementations, the version number of the translation configuration file may be indicated by a date. In these implementations, the determination in block 630 may include comparing the two dates to determine if the date of the latest version is different than the date of the currently installed version. Other comparisons could alternatively be made to determine whether the latest version of the translation configuration file is installed. For example, the comparison may simply be a determination of whether two values are the same or different.

When the latest version of the translation configuration file is newer than the current installed version of the translation configuration file (block 630—YES), the latest version of the translation configuration file may be downloaded (block 640). For example, the latest version of the translation configuration file may be downloaded from update server 210. The latest version of the configuration file may be used to overwrite the older version of the configuration file.

The latest version of the translation configuration file may then be parsed to determine the translation options and/or configurations that should be used by translation component 420 (block 650). The translation options and/or configurations may be set in translation component 420 and used during the operation of translation component 420. In the case of the translation configuration file shown in FIG. 5, for instance, the JSON formatted text may be parsed to determine the configuration information. The configuration information of FIG. 5 is shown as particularly relating to translation methods that may be used to perform a translation and language pairs may that be translated.

In one implementation, the translation configuration file may be parsed and used to set options/configuration information for translation component 420 each time toolbar 410 or translation component 420 is started. In other implementations, the configuration file may be parsed at other times.

As described above, configuration options for a language translation service, implemented by a browser toolbar, can be effectively and easily updated by the toolbar. The update of the toolbar may be performed automatically without requiring user intervention, which may advantageously increase user satisfaction with operation of the toolbar.

Figure 7:
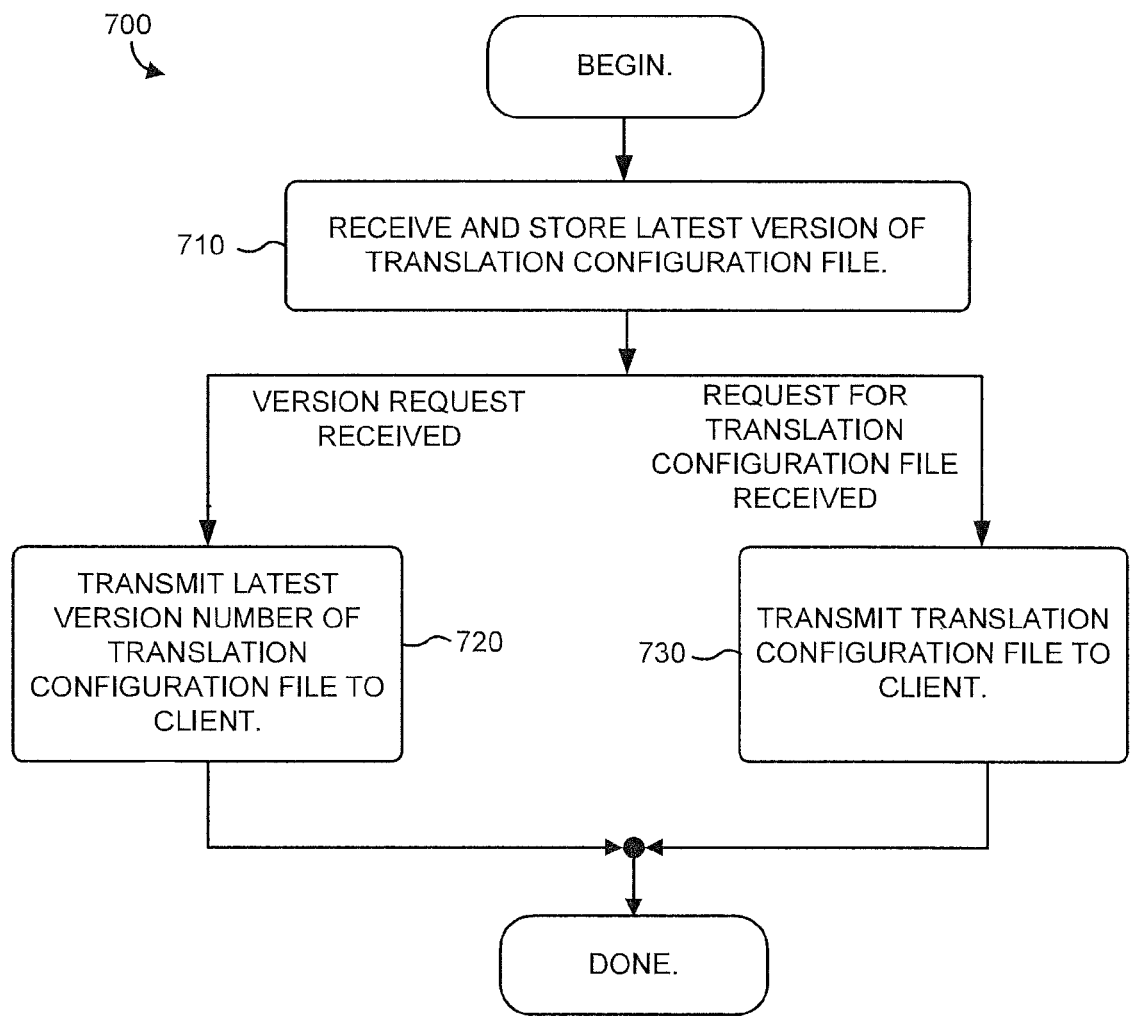
FIG. 7 is a flow chart illustrating an example of a process for operating an update server.

FIG. 7 is a flow chart illustrating an example of a process 700 for operating update server 210.

Process 700 may include receiving an updated (latest) version of the translation configuration file (block 710). The updated version of the translation configuration file may be a version of the file that was modified by an administrator to reflect changes in server configurations, protocols, and/or other changes that may affect the operation of translation component 420. The updated version of the translation configuration file may be stored by update server 210 (block 710). The updated version of the translation configuration file may be associated with a version number that may be changed with each change of the translation configuration file.

Process 700 may further include receiving and responding to messages from clients 205. The messages may be messages relating to the updating of translation component 420. Two messages are particularly shown as being received as part of process 700: a version request message and a request for the translation configuration file.

In response to the version request message, process 700 may include transmitting the version number of the latest version of the translation configuration file to the requesting client (block 720). In response to the request for the translation configuration file, process 700 may transmit the translation configuration file to the client (block 730). In an alternative possible implementation, instead of responding to a version request message, a client may send a client identifier message and the server may store an indication of the latest version that is installed by the client. The server may accordingly be able to determine whether to send the latest version of the translation configuration file based on the client identifier.

In one implementation, update server 210 may be configured to initially transmit a new version number of a configuration file to a select subset of the clients. This may allow for network traffic changes caused by the new configuration file to be evaluated before introducing the new configuration file to all the clients.

FIG. 8 is a diagram illustrating an example of a message flow that may be communicated between a client 205 and toolbar update component 430 when updating the translation services offered by toolbar 410. The message flow shown in FIG. 8 may correspond to operations previously discussed in reference to processes 600 and 700.

Client 205 may request, via message 810, a latest version number of the translation configuration file that is stored by update server 210 (see block 610). Update server 210, via message 820, may return the latest version number (e.g., version 2.2) of the translation configuration file (see block 720). If client 205 determines that the latest version is newer than the version it currently has (see block 630), the client may request, via message 830, the newer version of the translation configuration file. In response, update server 210, via message 840, may return the latest version of the translation configuration file (see blocks 640 and 730).

An implementation, described herein, may enable automatic updating of a translation service provided by a browser toolbar. The automatic updating can be scaled to support a large number of users.

The foregoing description provides illustration and description, but is not intended to be exhaustive or to limit the invention to the precise form disclosed. Modifications and variations are possible in light of the above teachings or may be acquired from practice of the invention. For example, while the automatic updating described herein was generally discussed as being performed in relation to automatic updating of a browser toolbar for translation services, the automatic updating may be applied to other areas, such as automatic updating of other types of software.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device implemented method comprising:
obtaining, by the device and via a browser toolbar implemented by the device, a version identifier corresponding to first configuration file, stored locally by the device, that includes configuration options relating to a language translation service provided by the browser toolbar, the browser toolbar being provided in a web browser application;
requesting, by the device, via the browser toolbar, and without intervention by a user of the device, a version identifier corresponding to a second configuration file, stored at an update server;
determining, by the device, via the browser toolbar, and based on the version identifiers corresponding to the first configuration file and the second configuration file, whether the second configuration file stored at the update server is different than the first configuration file, the first configuration file and the second configuration file comprising data stored as a key-value pair;

downloading, by the device, the second configuration file, from the update server, when the second configuration file is different than the first configuration file;

parsing, by the device and via the browser toolbar, the second configuration file to obtain updated configuration options relating to the language translation service provided by the browser toolbar; and updating, by the device and via the browser toolbar, operation of the language translation service based on the obtained options.

2. The method of claim 1, further comprising:

overwriting, when the second configuration file is downloaded, the first configuration file with the second configuration file.

3. The method of claim 1, where the parsing and the updating are performed when the browser toolbar is initially started.

4. The method of claim 1, where the version identifiers for the first configuration file and the second configuration file include a numeric value or a date value.

5. The method of claim 1, where the first configuration file and the second configuration file include text formatted files.

6. The method of claim 5, where the first configuration file and the second configuration file implement the JSON (JavaScript Object Notation) standard.

7. The method of claim 1, where the configuration options include options relating to two or more of languages available for translation, resources that are to be used for translation requests, or a format for the translation requests.

8. The method of claim 1, where the version identifier obtained for the first configuration file is included as a value within the first configuration file.

9. The method of claim 1, where the language translation service is provided by the browser toolbar based on requests to remote and local translation resources.

10. A device comprising:

a processor;

a memory;

a translation component, implemented by the processor and controlled via a graphical element in a browser toolbar, to perform language translation of documents stored in the memory of the device, the browser toolbar being provided in a web browser application; and a toolbar update component, implemented by the processor as part of the browser toolbar, to:

request, via a network, a version identifier corresponding to a latest version of a configuration file stored at a server, where the configuration file defines options relating to operation of the translation component, receive, in response to the request, the version identifier of the configuration file, determine, based on the received version identifier and based on a version identifier of a configuration file currently used by the translation component, whether the configuration file currently used by the translation component is to be updated, and overwrite, when the configuration file currently used by the translation component is to be updated, the configuration file currently used by the translation component with the latest version of the configuration file, wherein the configuration file currently used by the translation component and the latest version of the configuration file comprise data stored as a key-value pair.

11. The device of claim 10, further comprising:

a local dictionary to store translation resources used by the translation component when performing the language translation of the documents.

12. The device of claim 11, where the documents include documents defining web pages.

13. The device of claim 10, where the version identifiers, for the latest version of the configuration file and for the configuration file currently used by the translation component, include a numeric value or a date value.

14. The device of claim 10, where the latest version of the configuration file and the configuration file currently used by the translation component include text formatted files.

15. The device of claim 14, where the latest version of the configuration file and the configuration file currently used by the translation component implement the JSON (JavaScript Object Notation) standard.

16. The device of claim 10, where the options relating to the operation of the translation component include options relating to two or more of languages available for translation, resources that are to be used for translation requests, or a format for the translation requests.

17. The device of claim 10, where the version identifier of the configuration file currently used by the translation component is included as a value within the configuration file currently used by the translation component.

18. The device of claim 10, where the toolbar update component requests the version identifier without user intervention.

19. A non-transitory computer-readable medium containing instructions executable by at least one processor, the non-transitory computer-readable medium comprising:

instructions to obtain, via a browser toolbar, a version identifier corresponding to a first configuration file, stored locally, that includes configuration options relating to a language translation service provided by the browser toolbar, the browser toolbar being provided in a web browser application;

instructions to request, via the browser toolbar, a version identifier corresponding to a second configuration file, stored at an update server;

instructions to determine, via the browser toolbar and based on the version identifiers corresponding to the first configuration file and the second configuration file, whether the second configuration file stored at the update server is different than the first configuration file, the first configuration file and the second configuration file comprising data stored as a key-value pair;

instructions to download the second configuration file, from the update server, when the second configuration file is different than the first configuration file;

instructions to parse, via the browser toolbar, the second configuration file to obtain updated configuration options relating to the language translation service provided by the browser toolbar; and instructions to update via the browser toolbar, operation of the language translation service based on the obtained options.

20. The non-transitory computer-readable medium of claim 19, where the first configuration file and the second configuration file include text formatted files.

21. The non-transitory computer-readable medium of claim 20, where the first configuration file and the second configuration file implement the JSON (JavaScript Object Notation) standard.

22. The non-transitory computer-readable medium of claim 19, where the configuration options include options relating to two or more of languages available for translation, resources that are to be used for translation requests, or a format for the translation requests.

23. The non-transitory computer-readable medium of claim 19, where the language translation service is provided by the browser toolbar based on requests to remote and local translation resources.

24. The non-transitory computer-readable medium of claim 19, where the instructions to obtain the version identifier are performed in response to initialization of the browser toolbar.

* * * * *